United States Patent [19]
Takahashi et al.

[11] Patent Number: 5,212,022
[45] Date of Patent: May 18, 1993

[54] INTERNAL-REFORMING FUEL CELLS AND POWER STATIONS USING THE SAME

[75] Inventors: Tsutomu Takahashi, Ibaraki; Keizou Ohtsuka, Katsuta; Toshiki Kahara, Naka; Yasutaka Komatsu, Hitachi, all of Japan

[73] Assignee: Hitachi, Ltd., Tokyo, Japan

[21] Appl. No.: 585,508

[22] Filed: Sep. 20, 1990

[30] Foreign Application Priority Data

Sep. 20, 1989 [JP] Japan ................................ 1-243620

[51] Int. Cl.$^5$ ........................ H01M 8/18; H01M 8/06
[52] U.S. Cl. ...................................... 429/19; 429/20; 429/34
[58] Field of Search .................... 429/19, 20, 17, 34

[56] References Cited

U.S. PATENT DOCUMENTS

| | | | |
|---|---|---|---|
| 4,182,795 | 1/1980 | Baker et al. | 429/19 |
| 4,647,516 | 3/1987 | Matsumura et al. | 429/17 |
| 4,767,606 | 8/1988 | Trocciola et al. | 429/13 |
| 4,877,693 | 10/1989 | Baker | 429/34 |
| 5,077,148 | 12/1991 | Schora et al. | 429/39 |

*Primary Examiner*—Anthony McFarlane
*Attorney, Agent, or Firm*—Antonelli, Terry, Stout & Kraus

[57] ABSTRACT

The invention relates to internal-reforming fuel cells. They are each constructed of plural unit cells stacked one over another. Each unit cell is formed of a cathode, an electrolyte plate, an anode and a separator. Each unit cell also includes a generating zone formed by the cathode, anode and electrolyte plate; a reforming zone for reforming fuel gas; a fuel gas flow channel communicating with a fuel gas inlet and a fuel gas outlet and including a divided fuel gas flow channel for the unit cell; and an oxidant gas flow channel communicating with an oxidant gas inlet and an oxidant gas outlet and including a divided oxidant gas flow channel for the unit cell. The reforming zone is arranged in the fuel gas flow channel while the generating zone is arranged in contact with the fuel gas flow channel and the oxidant gas flow channel at a position downstream of the reforming zone while the fuel gas and oxidant gas are maintained separated from each other.

20 Claims, 10 Drawing Sheets

INTERNAL-REFORMING FUEL CELLS AND POWER STATIONS USING THE SAME

BACKGROUND OF THE INVENTION a. Field of the Invention

The present invention relates to long-life internal-reforming (IR) fuel cells and also to power stations using the same.

b. Description of the Related Art

Reforming fuel cells which use methane gas or the like as a fuel can be divided into two types, one being the internal-reforming type with a reforming means provided inside a fuel cell and the other the external-reforming type with a reforming means disposed outside a fuel cell.

The external reforming type is required to use more fuel gas and also to scale up its reforming means as more cells are used to form a fuel cell having greater generation capacity. Reactions which take place at electrodes of a fuel cell are exothermic reactions, so that the internal temperature of the cell hence arises. This leads to evaporation of an electrolyte or the like, whereby the life of the cell is shortened. To avoid this problem, a cooling means is indispensable. The external reforming type requires a high initial cost as it needs large reforming and cooling means as described above.

On the other hand, the internal reforming type does not require any particularly large reforming means because methane gas is reformed unit cell by unit cell. When unit cells are stacked one over another to permit absorption of heat, which is generated by reactions at their electrodes, by making use of the fact that the reforming reaction is an endothermic reaction, the internal temperature of the cell does not increase. In this manner, the cooling means can also be obviated.

As conventional IR fuel cells, fuel cells of the construction where, with a view toward preventing internal temperature increase of the cells, a reforming catalyst is provided right underneath each anode to permit immediate absorption of reaction heat to be generated by a power generating reaction are disclosed, for example, in Fuel Cell Technology and Applications (International Seminar, The Netherlands, Oct. 26-29, 1987), Extended Abstracts, pages 41 and 45.

The portion right underneath each anode is however a gas flow channel through which both fresh fuel gas and fuel gas after the electrode reaction (i.e., exhaust fuel gas) flow, so that the reforming catalyst is exposed not only to the fresh fuel gas but also to the exhaust fuel gas.

Exhaust fuel gas contains an electrolyte composition and reaction products formed in the electrolyte. Such materials contained in exhaust fuel gas are therefore brought into contact with the reforming catalyst, whereby the reforming catalyst is contaminated. Molten electrolyte and the like, which have flowed down along the surface of an associated separator, also penetrate to the reforming catalyst located below the separator and contaminate the reforming catalyst.

As operation time lengthens, contamination of the reforming catalyst becomes more severe so that the activity of the catalyst is reduced and the conversion from methane gas to hydrogen gas is lowered. As a result, the voltage of the fuel cell drops abruptly.

FIG. 8 diagrammatically illustrates the results of experiments conducted using the same fuel cell, one on generation of power by an internal reforming method in which methane gas was employed as a fuel and the other on generation of power by an external reforming method in which hydrogen gas was fed from the beginning.

Cell voltage is plotted along the axis of ordinates, while operation time is plotted along the axis of abscissas.

As is clearly envisaged from FIG. 8, the open circuit voltage remained substantially constant within a range of 1.0-1.1 V in both the generation of power by the internal reforming method and that by the external reforming method. When a current of 150 mA/cm$^2$ current density was applied through a closed circuit, the cell voltage did not drop to or beyond 0.7 in the case of generation of power by the external reforming method even when operation time lengthened. In the case of generation of power by the internal reforming method, the cell voltage however abruptly dropped as operation time lengthened and, upon an elapsed time of 330 hours, the cell voltage dropped to 0.4 V and the operation stopped.

As has been described above, the conventional IR fuel cells can theoretically be expected to have longer cell life if temperature increase inside the cells can be prevented. Prevention of temperature increase inside the cells cannot however bring about sufficient effects in practice because performance deterioration of a reforming catalyst proceeds very fast. As a consequence, the IR fuel cells are still accompanied by the drawback that they cannot achieve satisfactory cell life.

Further, a power station making use of such IR fuel cells requires a cell replacement whenever the cell voltage drops, leading to the problem that the efficiency of its operation is low.

SUMMARY OF THE INVENTION

A first object of the present invention is to provide an IR fuel cell which can avoid deterioration of its reforming catalyst and can achieve long life.

A second object of the present invention is to provide a power station which uses IR fuel cells and has high efficiency of operation.

To achieve the first object, there is provided in one aspect of the invention an internal-reforming fuel cell comprising:

a fuel gas flow channel for guiding fuel gas, which is to be supplied, from a fuel gas inlet to a fuel gas outlet;

an oxidant gas flow channel for guiding oxidant gas, which is to be supplied, from an oxidant gas inlet to an oxidant gas outlet;

a reforming zone for reforming the fuel gas; and a generating zone formed of a cathode, an electrolyte and an anode, wherein said reforming zone is provided in said fuel gas flow channel; and said generating zone is arranged such that said generating zone contacts said fuel gas flow channel and said oxidant gas flow channel at a position downstream of said reforming zone as viewed in the direction of flow of the fuel gas while the fuel gas and oxidant gas are maintained separated from each other.

In another aspect of the invention, there is also provided an internal-reforming fuel cell comprising:

a generating zone;

a reforming zone for reforming fuel gas;

a first fuel gas flow channel extending from a fuel gas inlet to said generating zone;

a second fuel gas flow channel communicating with said first fuel gas flow channel and extending to a fuel gas outlet;

a first oxidant gas flow passage extending from an oxidant gas inlet to said generating zone; and a second oxidant gas flow channel extending from said generating zone to an oxidant gas outlet;

wherein said second fuel gas flow channel is provided along a route substantially different from said first fuel gas flow channel;

said reforming zone is provided in said first fuel gas flow channel; and said generating zone is arranged in contact with said second fuel gas flow channel and said second oxidant gas flow channel such that mixing of the fuel gas and the oxidant gas can be avoided.

In a further aspect of the invention, there is also provided an internal-reforming fuel cell comprising a plurality of unit cells stacked together, each of said unit cells being formed of a cathode, an electrolyte plate, an anode and a separator, wherein each of said unit cells has a generating zone constructed by said cathode, electrolyte plate and anode, a reforming zone for reforming fuel gas, a fuel gas flow channel communicating with a fuel gas inlet and a fuel gas outlet and including a divided fuel gas flow channel for said unit cell, and an oxidant gas flow channel communicating with an oxidant gas inlet and an oxidant gas outlet and including a divided oxidant gas flow channel for said unit cell; said reforming zone is arranged in said fuel gas flow channel; and said generating zone is arranged in contact with said fuel gas flow channel and said oxidant gas flow channel at a position downstream of said reforming zone while the fuel gas and oxidant gas are maintained separated from each other.

The reforming zone of each unit cell can preferably be arranged at a position overlapped, as viewed in the direction of stacking of the unit cells, with the generating zone of another unit cell located adjacent to said first-mentioned unit cell as viewed in the direction of stacking of the unit cells.

As an alternative, the reforming zone and generating zone of each unit cell can be provided at positions complementary or corresponding to the generating zone and reforming zone of each unit cell located adjacent to the first-mentioned unit cell as viewed in the direction of stacking of the unit cells.

Further, the individual unit cells can belong to either one of a first system or a second system. The unit cells in the first system and the unit cells in said second system can be alternately stacked in the direction of stacking of the unit cells. The reforming zones of the unit cells in the first system can be arranged at positions overlapped with the generating zones of the unit cells in the second system as viewed in the direction of stacking of the unit cells, and the flow channels associated with the unit cells in the first system can be formed independently of the flow channels associated with the unit cells in the second system.

In a still further aspect of the invention to achieve the second object, there is also provided a power station for performing generation of power by using at least a fuel cell, a fuel gas source and an oxidant gas source. The fuel cell has a reforming zone in which a reforming catalyst for reforming fuel gas is contained. The reforming zone is arranged on an upstream side, relative to a flow of the fuel gas, of a generating zone constructed of a cathode, an electrolyte plate and an anode.

When the reforming catalyst contacts an electrolyte composition or reaction products formed in the electrolyte, the activity of the catalyst is reduced so that the conversion from methane gas to hydrogen gas is lowered. Accordingly, a contaminated reforming catalyst leads to an abrupt reduction of the voltage of an associated fuel cell.

Such contaminant materials for reforming catalysts are abundantly contained in exhaust fuel gas which has been used in an electrode reaction.

In the invention, the reforming zone and generating zone are substantially separated from each other with respect to a flow channel for fuel gas in each cell and are provided in the order described above.

Therefore, the reforming catalyst is not contaminated by the above-described materials contained in exhaust fuel gas and is allowed to maintain its activity over a long period of time, so that a fuel cell having long life can be obtained.

Moreover, the reforming zone of a desired cell can be provided at a position overlapped with the generating zone of another unit cell disposed adjacent to the first-mentioned unit cell as viewed in the direction of stacking of the plural cells stacked one over another.

Heat to be generated upon power-generating reaction in the generating zone can therefore be effectively used as a heat source for the reaction to be conducted in the reforming zone, whereby temperature increase inside the cell can be prevented and the cell can be enjoy long life.

DESCRIPTION OF PREFERRED EMBODIMENTS

Some embodiments of the invention will hereinafter be described, but it is to be understood that the invention is not limited thereto.

Although no particular limitation is imposed on materials employed in a fuel cell of the invention such as anodes, cathodes, electrolyte plates, fuel gas and oxidant gas, materials are selected in the following embodiments so that molten carbonate fuel cells be constructed.

The fuel cell of each embodiment is enclosed in an unillustrated pressure vessel.

An IR fuel cell according to one embodiment of the invention, which uses the internal manifold system, will be described with reference to FIG. 1 through FIG. 5.

Figure 1:
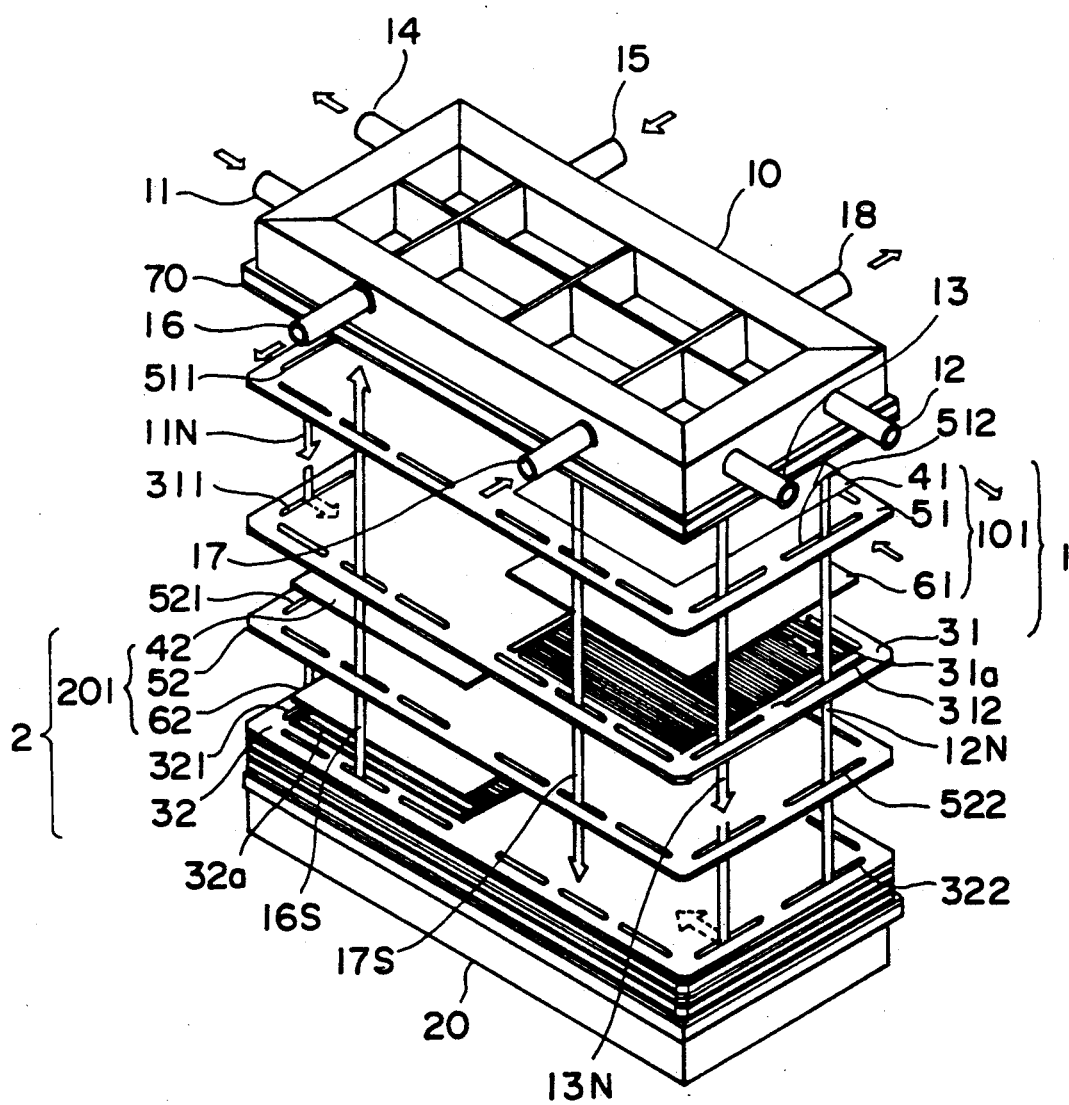
FIG. 1 is an exploded perspective view of an IR fuel cell according to one embodiment of the invention, in which the internal manifold system is used.

FIG. 1 is a perspective view showing the basic construction of the IR fuel cell according to the embodiment of the invention.

An upper header 10 for feeding gases into the cell is arranged in an uppermost part of the cell shown in FIG. 1, while a lower header 20 is disposed in a lowermost part of the cell.

Between the upper header 10 and the lower header 20, plural unit cells 1 and 2 are repeatedly stacked, each unit cell 1 having a cathode 41, an electrolyte plate 51, an anode 61 and a separator 31 while each unit cell 2 including a cathode 42, an electrolyte plate 52, an anode 62 and a separator 32.

In each unit cell 1, the cathode 41 and anode 61 sandwich an approximately half portion of the electrolyte plate 51 from both upper and lower sides except for manifolds formed as gas flow passages in a peripheral edge portion of the electrolyte plate 51, in other words, without covering the manifolds, whereby a generating zone 101 of the unit cell 1 is formed. The half portion extends from a longitudinal center line of the electrolyte plate 51 to a right-hand end thereof as viewed in FIG. 1.

In each unit cell 2, the cathode 42 and anode 62 similarly sandwich an approximately half portion of the electrolyte plate 52 from both upper and lower sides without covering manifolds formed as gas flow passages in a peripheral edge portion of the electrolyte plate 52, whereby a generating zone 201 is formed. The half portion extends from a longitudinal center line of the electrolyte plate 52 to a left-hand end thereof as viewed in FIG. 1.

Manifolds to be employed as gas flow passages are also formed in peripheral edge portions of the separators 31, 32 which are formed in a rectangular shape in the illustrated embodiment.

Each unit cell 1 and its associated unit cell 2 are stacked in such a way that the generating zone 101 of the unit cell 1 and the generating zone 201 of the unit cell 2 are arranged on opposite sides relative to an imaginary vertical lateral center plane of the IR fuel cell as shown in FIG. 1.

Each separator 31 has such a structure that, as will be described subsequently, the anode 61 of the associated unit cell 1 is assembled on an upper side thereof with a corrugated portion 31a interposed therebetween and the cathode 42 of the associated unit cell 2 is assembled on a lower side thereof with an unillustrated corrugated portion 31c (see FIG. 3) interposed therebetween. In addition, each separator 31 is internally provided with a reforming zone 102 formed of a reforming catalyst (see FIG. 2 and FIG. 3) in such a way that the reforming zone 102 is located on the side opposite to the generating zone 101 of the associated unit cell 1 relative to the imaginary vertical lateral center plane of the IR fuel cell.

Between the upper header 10 and the proximal cathode 41, an end plate 70 is arranged to prevent contact therebetween.

Gases are fed to the fuel cell from corresponding gas sources which are not shown in the drawing.

As a method for causing each gas to flow in a prescribed direction inside the fuel cell, the gas can be fed into the fuel cell by using a compressor, a blower or the like. In the present embodiment, a compressor is used.

The upper gas header 10 is equipped with inlet gas tubes and outlet gas tubes, which are employed for two cell systems, respectively, in other words, in association with gas flow channels of a cell system consisting of the cells 1 and in association with gas flow channels of another cell system consisting of the cells 2.

The gas tubes employed for the system of cells 1 consist of an inlet tube 11 for introducing fuel gas, an outlet tube 12 for discharging exhaust fuel gas, an inlet tube 17 for introducing oxidant gas, and an outlet tube 18 for discharging exhaust oxidant gas.

The gas tubes employed for the system of cells 2 consist of an inlet tube 13 for introducing fuel gas, an outlet tube 14 for discharging exhaust fuel gas, an inlet tube 15 for introducing oxidant gas, and an outlet tube 16 for discharging exhaust oxidant gas.

For example, a fuel gas stream 11N introduced through the inlet tube 11 for feeding fuel gas to the system of the cells 1 passes through a manifold 511 of the electrolyte plate 51, a manifold 311 of the separator 31, a manifold 521 of the electrolyte plate 52 and a manifold 321 of the separator 32 and flows further to the lower cells. A portion of the fuel gas is introduced into the unit cell 1 through the manifold 311 as will be described subsequently.

On the other hand, an exhaust fuel gas stream 12N of the system of the cells 1 passes through a manifold 322 of the separator 32, a manifold 522 of the electrolyte plate 52, a manifold 312 of the separator 31 and a manifold 512 of the electrolyte plate 51 and then flows out through the outlet tube 12. Exhaust fuel gas occurred in the unit cell 1 is discharged through the manifold 312 as will be described subsequently.

Another gas stream introduced through the upper gas header 10 and another gas stream discharged through the upper gas header 10 pass through manifolds formed in the individual separators and electrolyte plates in a similar manner to the gas stream 11N and 12N.

The structure of the separator 31 of each unit cell 1 will next be described with reference to FIG. 2 and FIG. 3.

Figure 2:
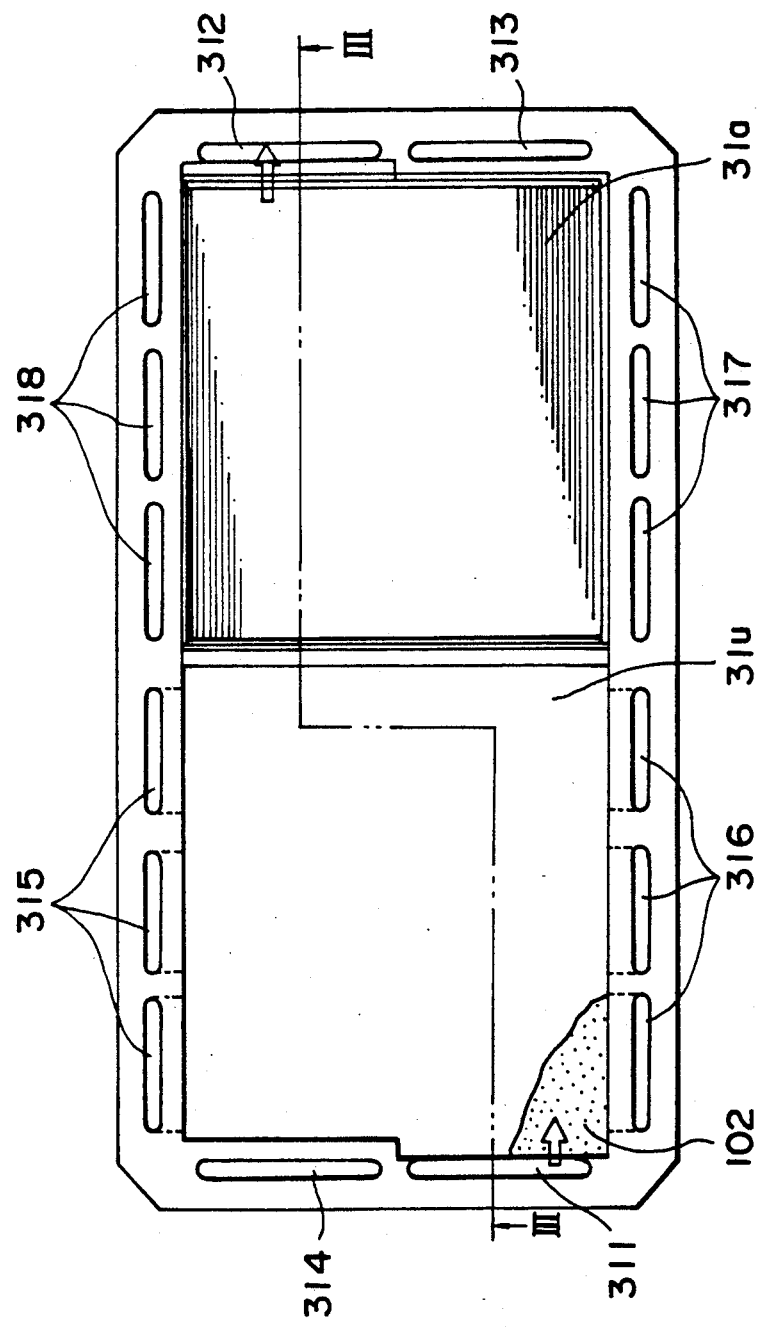
FIG. 2 and FIG. 4 are plan views of a separator employed in the IR fuel cell shown in FIG. 1.

FIG. 2 is a plan view of the separator 31.

The separator 31 has a double-layer structure consisting of an upper layer and a lower layer as will be described subsequently with reference to FIG. 3.

In a peripheral edge portion of the separator 31, there are formed manifolds 311, 313 for fuel gas, manifolds 312, 314 for exhaust fuel gas, manifolds 315, 317 for oxidant gas, and manifolds 316, 318 for exhaust oxidant gas.

The manifold 311 is in communication with an upper layer of the separator 31 such that fuel gas can be introduced into the upper layer of the separator 31. Similarly, the manifold 312 is in communication with the separator 31 such that gas which has passed through the upper layer of the separator 31 can be discharged therethrough. The manifold 313 which is not in communication with the separator 31 serves to allow the fuel gas to flow to the system of the cells 2 located under the manifold 313. On the other hand, the manifold 314 permits passage of exhaust fuel gas from the system of the cells 2. The manifold 311 and manifold 312 and the manifold 314 and manifold 313 are provided in opposing end portions of the separator 31 at positions deviated from positions where their distances are the shortest, so that the paths of the fuel gas passing through the reforming zone 102 become longer.

The manifold 315 is in communication with the lower layer of the separator 31 so that oxidant gas can be introduced into the lower layer of the separator 31. Similarly, the manifold 316 is in communication with the lower layer of the separator 31 so that gas which has passed through the separator 31 can be discharged therethrough. The manifold 317 which is not in communication with the separator 31 serves to allow the oxidant gas to flow to the lower cells. Further, the manifold 318 permits passage of exhaust oxidant gas from the system of the cells 1.

Figure 3:
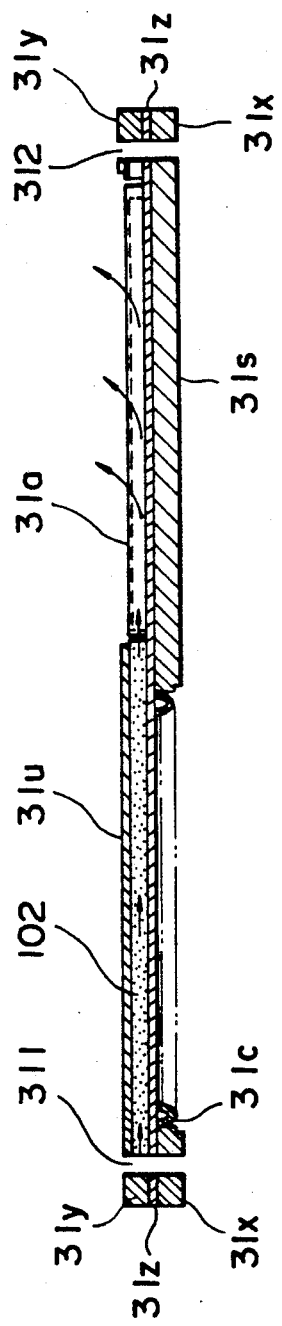
FIG. 3 is a cross-sectional view taken in the direction of arrows III—III of FIG. 2.

FIG. 3 is a cross-sectional view taken in the direction of arrows III—III of FIG. 2.

The separator 31 is divided into the upper layer and the lower layer with a partition wall 31z interposed therebetween. The partition wall 31z vertically divides the separator 31. Further, the upper layer is covered by a frame 31y while the lower layer is covered by a frame 31x.

In the upper layer, the fuel gas flows from the manifold 311 toward the manifold 312. In the lower layer, the oxidant gas flows in a direction perpendicular to the drawing sheet, from the back side of the drawing sheet toward the reader.

The construction of the upper layer of the separator 31 will now be described.

The upper layer of the separator 31 is provided on an upstream side of the flow of the fuel gas (i.e., on the side of the manifold 311) with the reforming zone 102, which contains a reforming catalyst for reforming the fuel gas that passes through the reforming zone. On a downstream side of the flow of the fuel gas (i.e., on the side of the manifold 312), there is also provided the corrugated portion 31a which serves as a gas flow passage for the fuel gas.

A cover plate 31u is provided over the reforming zone 102 so that the electrolyte plate 51 shown in FIG. 1 can be maintained out of contact with the catalyst. The thickness of the cover plate 31u is adjusted so that the anode 61 also depicted in FIG. 1 and attached to the corrugated portion 31a can contact the electrolyte plate 51. The cover plate 31u also serves as a gas stream regulator means for guiding to the corrugated portion 31a the fuel gas which has been introduced into the upper layer of the separator 31.

The construction of the lower layer of the separator 31 will next be described.

The corrugated portion 31c which serves as a gas flow passage for the oxidant gas is provided at a position substantially opposite to the reforming zone 102 with the partition wall 31z interposed therebetween. The corrugated portion 31c is formed such that ridges thereof extend in a direction perpendicular to the drawing sheet, in other words, in the direction extending from the manifold 315 to the manifold 316 as viewed in FIG. 2. The remaining portion of the lower layer of the separator 31 is provided with a thickness-adjusting plate portion 31s the thickness of which has been adjusted to allow the cathode 42 of the unit cell 2 shown in FIG. 1, said cathode 42 being attached to the corrugated portion 31c, to contact the electrolyte plate 52.

It is not absolutely necessary to form the corrugated portion 31a in the form of a corrugated plate provided that it has at least one projection capable of supporting the associated anode and at least one recess capable of serving as a flow channel for the gas. For example, the corrugated portion 31a can be replaced by a planar plate with one or more grooves formed therein. Similarly, it is not absolutely necessary to form the corrugated portion 31c in the form of a corrugated plate.

No particular limitation is imposed on the materials to be used for the flames 31y, 31x and the thickness-adjusting plate portion 31s. It is preferable to use similar materials for them in order to avoid thermal strain.

Figure 4:
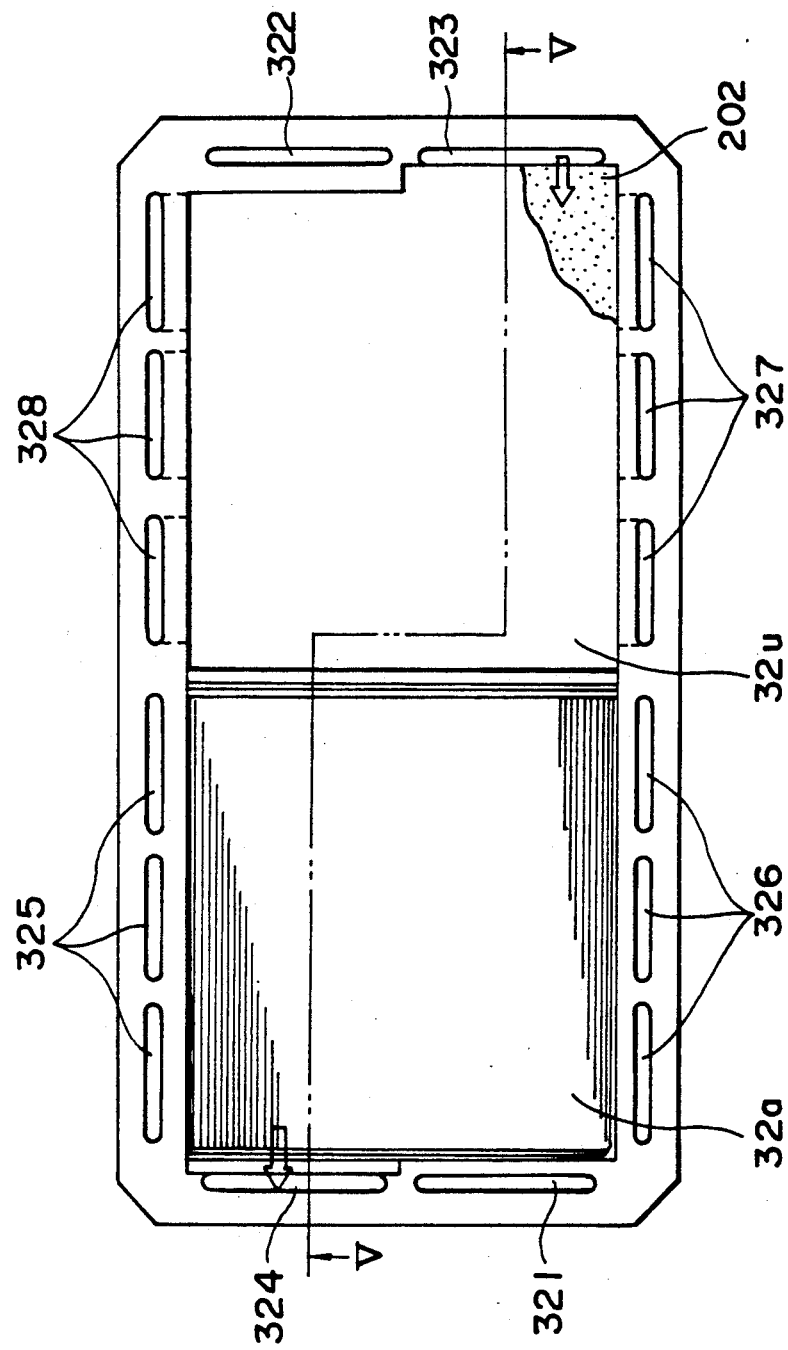
Figure 5:
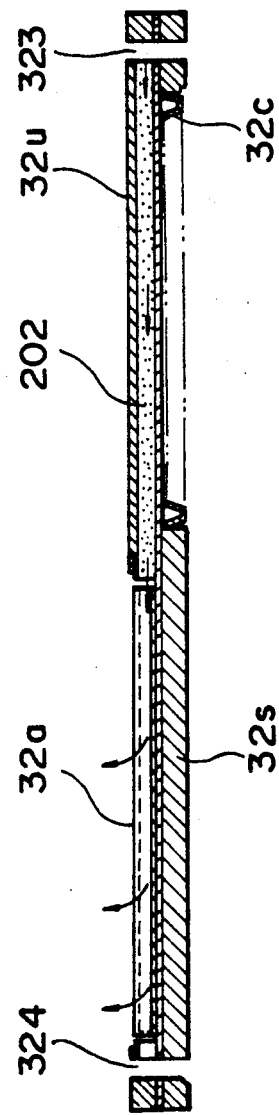
FIG. 5 is a cross-sectional view taken in the direction of arrows V—V of FIG. 4.

The structure of the separator 32 of each cell 2 will next be described with reference to FIG. 4 and FIG. 5. FIG. 4 is a plan view of the separator 32, while FIG. 5 is a cross-sectional view taken in the direction of arrows V—V of FIG. 4.

The separator 32 has the manifolds for introducing or discharging fuel gas and oxidant gas for the system of the cells 2, said fuel gas and oxidant gas being different from the fuel gas and oxidant gas introduced or discharged through the manifolds of the separator 31 depicted in FIG. 2.

The separator 32 has substantially the same construction as the separator 31 except that a reforming zone 202, a corrugated portion 32a as a gas flow channel for the fuel gas and a corrugated portion 32c as a gas flow channel for the oxidant gas are opposite to their corresponding elements of the separator 31 relative to the imaginary vertical lateral plane.

Flows of the gases in the fuel cell of the present embodiment will be described with reference to FIG. 1, FIG. 3 and FIG. 5.

The fuel gas fed to the fuel cell by the unillustrated compressor is introduced through the tubes 11, 13, so that they flow downwards inside the cell as the fuel gas stream 11N for the cells 1 and the fuel gas stream 13N for the cells 2.

Described more specifically, a portion of the fuel gas stream 11N which has been introduced through the tube 11 and has been fed into each separator 31 through the manifold 311 by way of the manifold 511 of the electrolyte plate 51 is brought into contact with the reforming catalyst in the reforming zone 102, whereby the fuel gas is subjected to reforming treatment. The fuel gas thus reformed then flows along individual grooves of the corrugated portion 31a and is subjected to an electrode reaction in the generating zone 101 arranged above the corrugated portion 31a. Exhaust fuel gas which has been subjected to the electrode reaction joins, in the manifold 312, the exhaust fuel gas stream 12N which has been similarly formed in the lower cells and discharged therefrom, and is then discharged to the outside through the tube 12 attached to the upper header 10.

On the other hand, a portion of the fuel gas stream 13N is likewise fed into each separator 32. The fuel gas thus introduced is similarly guided through the reforming zone 202 and then to the generating zone 201 with the anode 62 contained therein. The resulting exhaust fuel gas joins another exhaust fuel gas stream in the manifold 324 and is then discharged to the outside through the tube 14 attached to the upper header 10.

An oxidant gas stream 17S introduced into the fuel cell through the tube 17 by the unillustrated compressor flows a corrugated portion (not shown) of the end plate 70 attached to the upper header 10, said corrugated portion serving as a gas flow passage for the oxidant gas, and is then used for an electrode reaction at the generating zone including the cathode 41. The resulting exhaust oxidant gas joins an exhaust oxidant gas stream from the lower cells and is then discharged out of the cell through the tube 18 provided to the upper header 10.

Similarly, a portion of another oxidant gas stream introduced through the other oxidant gas inlet tube 15 is introduced into each separator 31 through the corresponding manifold, flows through the corrugated portion 31c as a flow channel for the oxidant gas, and is then employed for an electrode reaction at the generating zone including the cathode 42. The resulting exhaust oxidant gas flows through the manifold 316, joins an exhaust oxidant gas stream 16s, and is discharged out of the cell.

Operation of the IR fuel cell of the present embodiment will next be described.

For example, in each unit cell 1 of the IR fuel cell of the present embodiment, the reforming zone 102 is provided inside the separator 31 covered by the cover plate 31u while the generating zone 101 is shifted from the reforming zone 102 and is provided on the corrugated portion 31a as an exposed portion of the separator 31. In this manner, the reforming zone 102 and the generating zone 101 are separated from each other in the unit cell 1.

The fuel gas introduced into each separator 31 is, after being reformed in the reforming zone 102, used for the electrode reaction in the generating zone 101, so that the exhaust fuel gas is formed. The exhaust gas joins, in the manifold 312, the exhaust gas stream 12N and is discharged out of the system. Accordingly, the exhaust fuel gas after use at the electrodes is prevented from flowing into the reforming zone 102.

Each unit cell 2 is similarly divided into the reforming zone 202 and the generating zone 201. The resulting exhaust fuel gas is allowed to flow out of the unit cell 2 without flowing into the reforming zone 202.

The exhaust fuel gas containing the electrolyte composition and the reaction products formed in the electrolyte therefore do not contaminate the reforming catalyst. As a consequence, the activity of the reforming catalyst can be maintained for a long time so that the life of the cell becomes longer.

Further, the reforming zone 102 of each unit cell 1 and the generating zone 201 of the associated unit cell 2 are arranged in an opposing up-to-down relation with the corrugated portion 31c and partition wall 31z interposed therebetween. Owing to this arrangement, heat to be generated upon generating reaction in the generating zone 201 can be effectively used as a heat source for the reforming reaction in the reforming zone 102, thereby making it possible to avoid temperature increase inside the cell.

Figure 6:
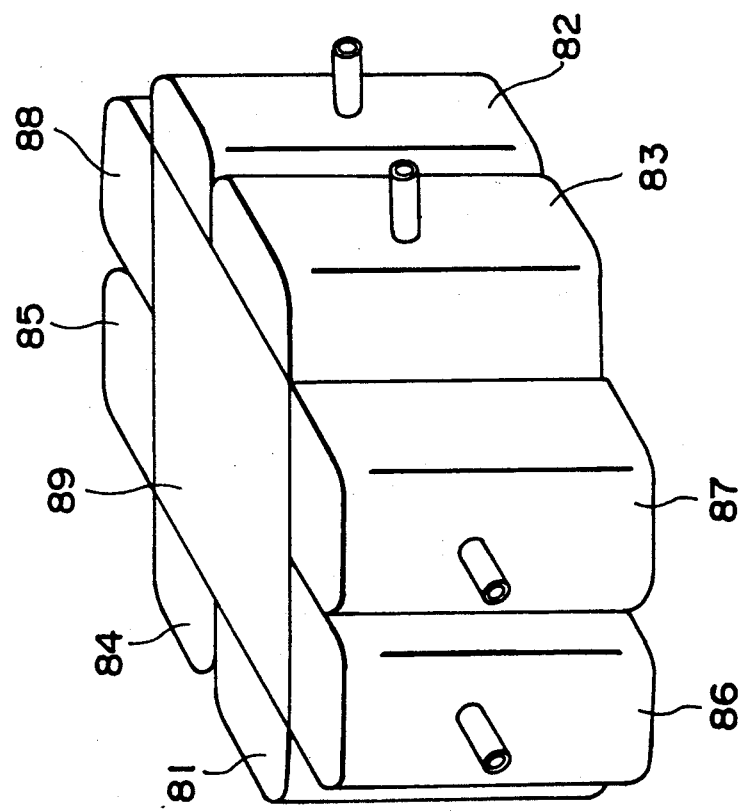
FIG. 6 is a perspective view of another embodiment of the invention, in which the external manifold system is applied to the IR fuel cell depicted in FIG. 1.

FIG. 6 illustrates another embodiment in which the present invention has been applied to the external manifold system.

In an IR fuel cell of the internal manifold system, manifolds are formed in peripheral edge portions of electrolyte plates and separators as shown in FIG. 1. In the external manifold system, manifolds 81, 83 for introducing fuel gas, manifolds 82, 84 for discharging exhaust fuel gas, manifolds 85, 87 for introducing oxidant gas and manifolds 86, 88 for discharging exhaust oxidant gas are provided on side walls of a cell main body 89 formed of unit cells stacked one over another.

The fuel cell of this embodiment is similar to the fuel cell of the embodiment shown in FIG. 1 except that the above manifolds are provided outside the cell main body. This embodiment can achieve similar advantageous effects as the fuel cell depicted in FIG. 1.

Figure 7:
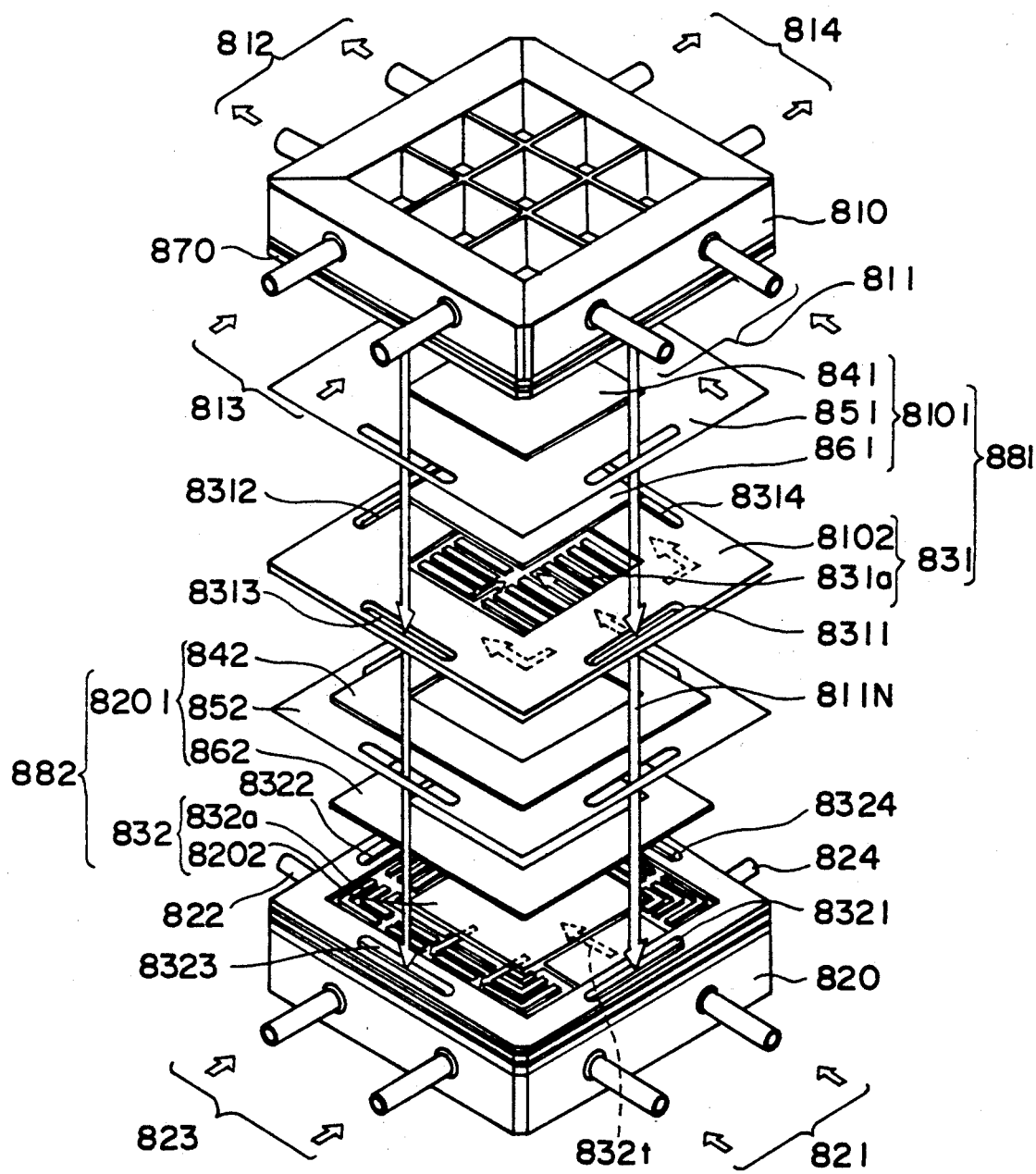
FIG. 7 is an exploded perspective view of an IR fuel cell according to a further embodiment of the invention.
Figure 8:
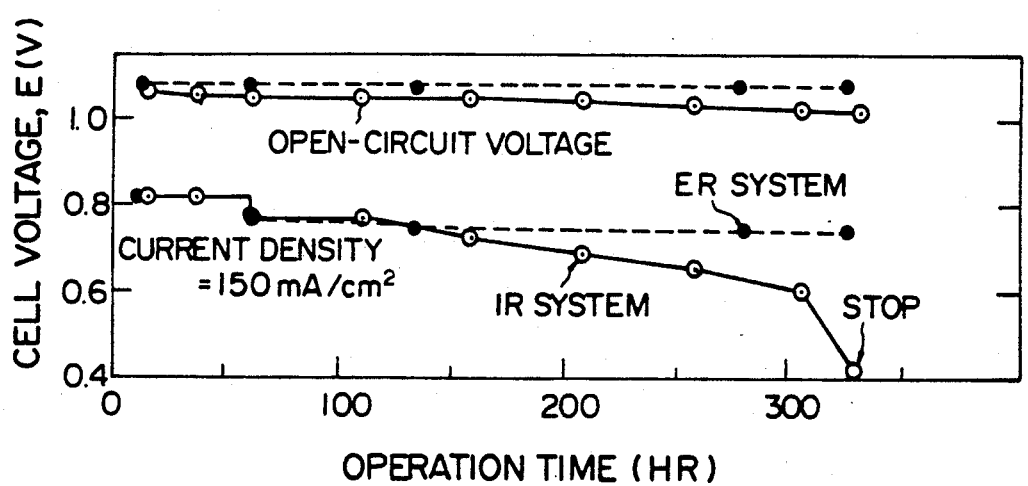
FIG. 8 is a diagram showing a relationship between cell voltage and operation time when power generation was effected by conventional internal and external reforming methods, respectively.

FIG. 7 illustrates a further embodiment, in which unit cells are stacked with their reforming zones and generating zones arranged alternately in a central part and in an outer part of the fuel cell.

An upper header 810 for feeding gases into the cell is arranged in an uppermost part of the cell shown in FIG. 7, while a lower header 820 is disposed in a lowermost part of the cell.

Between the upper header 810 and the lower header 820, plural unit cells 881 and 882 are repeatedly stacked, each unit cell 881 having a cathode 841, an electrolyte plate 851, an anode 861 and a separator 831 while each unit cell 882 including a cathode 842, an electrolyte plate 852, an anode 862 and a separator 832.

Each cathode 841 in a substantially square shape and its associated anode 861 also in a substantially square shape sandwich a central part of an associated electrolyte plate 851 of substantially a square shape from both upper and lower sides, whereby a generating zone 8101 of the unit cell 881 is formed.

Each cathode 842 in a substantially square shape and its associated anode 862 also in a substantially square shape sandwich an associated electrolyte plate 852 of substantially a square shape from both upper and lower sides, whereby a generating zone 8201 of the unit cell 882 is formed.

Each separator 831 has a double-layer structure consisting of an upper layer and a lower layer similarly to the separators described with reference to FIG. 1. Gas-introducing manifolds 8311–8314 are formed in a peripheral edge portion of the separator 831.

Fuel gas is introduced into the upper layer of the separator 831 through the gas introducing manifold 8311 and is discharged from the upper layer through the gas discharging manifold 8312 located on a side opposite from the gas introducing manifold 8311. The upper layer is also constructed to assemble the anode 861 thereon by way of a corrugated portion 831a provided at the central part thereof. No reforming zone is however provided between the corrugated portion 831a and the manifold 8312 but a flow passage is formed there to permit passage of the gas.

Oxidant gas is introduced into the lower layer of the separator 831 through the gas introducing manifold 8313 and is discharged from the lower layer through the gas discharging manifold 8314 located on a side opposite from the gas introducing manifold 8313. The lower layer is also constructed to assemble, by way of an unillustrated corrugated portion, the cathode 842 in the form of a square frame.

Similarly, each separator 832 has a double-layer structure consisting of an upper layer and a lower layer. Gas-introducing manifolds 8321–8324 are formed in a peripheral edge portion of the separator 832 at locations corresponding to the manifolds 8311–8314 of the adjacent separator 831.

The upper layer of the separator 832 is constructed to assemble the anode 862 in the form of a square frame thereon by way of a corrugated portion 832a. A reforming zone 8202 is provided inside the corrugated portion 832a. There is also formed a communication channel 832t which connects the reforming zone 8202 to the manifold 8321 adapted to introduce the fuel gas into the separator 832.

The lower layer is constructed to assemble an unillustrated cathode of a substantially square shape thereon by way of a corrugated portion (not shown).

The upper gas header 810 has an opposing side walls inlet tubes 811 for introducing fuel gas and outlet tubes 812 for discharging exhaust fuel gas and on the other opposing side walls inlet tubes 813 for introducing oxidant gas and outlet tubes 814 for discharging the oxidant gas.

The lower gas header 820 is also provided with gas tubes 821–824 similarly to the upper gas header 810. Each gas introduced or discharged through the lower gas header 820 flow through the fuel cell by using the same manifolds as the corresponding gas introduced or discharged through the upper gas header 810.

Flow of each gas will next be described.

Each gas is fed into the fuel cell by means of an unillustrated compressor.

The fuel gas introduced through the inlet tubes 811 flows downwards in the cell as viewed in FIG. 7.

A portion of a fuel gas stream 811N is introduced into the upper layer of each separator 831 through the manifold 8311. In the reforming zone 8102 defined by the unillustrated cover plate and partition walls and forming a gas flow passage, the fuel gas introduced into the upper layer of the separator 831 is reformed. The fuel gas thus reformed flows to the corrugated portions 831a and is then used for an electrode reaction in the generating zone 8101 arranged above the corrugated portion 831a and containing the anode 861. The resulting exhaust fuel gas flows through a channel which extends between the corrugated portion 831a and the manifold 8312, and then joins an exhaust gas stream from the lower unit cells.

On the other hand, the fuel gas introduced into each separator 832 through the manifold 8321 flows through the communication channel 832t and is reformed in the reforming zone 8202. The fuel gas thus reformed then flows to the corrugated portion 832a and is used for an electrode reaction in the generating zone 8201 provided above the currugated portion 832a and containing the anode 862. The resulting exhaust fuel gas then joins another exhaust fuel gas stream in the manifold 8322.

The exhaust gas stream is discharged out of the cell through the tubes 812 attached to the upper header 810.

On the other hand, the oxidant gas introduced through the inlet tube 813 flows downwards through the cell as viewed in FIG. 7.

The oxidant gas used in the generating zone 8101 flows along a gas-passage-defining corrugated portion (not shown) of the end plate 870 attached to the upper header 810 and is employed for an electrode reaction at the cathode 841. The resulting exhaust oxidant gas join in the manifold an exhaust oxidant gas stream from the lower unit cells and is discharged out of the cell through the exhaust oxidant gas tubes 814 attached to the upper header 810.

The oxidant gas to be used in the generating zone 8201 is introduced into the separator 831 through the manifold 8313, and is used for an electrode reaction in the generating zone 8201 which is provided below an oxidant-gas-passage-defining corrugated portion formed on the back side of the separator 831 and which contains the cathode 842. The resulting exhaust oxidant gas joins an exhaust oxidant gas stream in the manifold 8314 and is then discharged out of the cell through the exhaust oxidant gas outlet tubes 814.

The gases introduced through the lower header 820 are fed into the reforming zones and generating zones in a similar manner to the gases introduced through the upper header 810. The gases introduced through the lower header 820 are effective especially in feeding gases to the unit cells stacked in a lower part.

Operation of the IR fuel cell of this embodiment will next be described.

Similarly to the embodiment depicted in FIG. 1, in each unit cell of the IR fuel cell of this embodiment, the reforming zone is provided inside the separator divided by the cover plate while the generating zone is shifted from the reforming zone and is provided on the corrugated portion as the exposed portion of the separator. The reforming zone and generating zone are therefore separated from each other. The fuel gas introduced into the separator is reformed in the reforming zone and is then used in an electrode reaction in the generating zone, so that the fuel gas is converted to exhausted fuel gas. This exhausted fuel gas flows out through the gas flow channel defined by the corrugated portion, joins the exhaust gas stream and is discharged out of the system. Accordingly, the exhaust fuel gas after use at the electrodes is prevented from flowing into the reforming zone.

Further, the reforming zone of each unit cell and the generating zone of the unit cell disposed below the first-mentioned unit cell are arranged in an opposing up-to-down relation with the corrugated portion and partition wall interposed therebetween. Owing to this arrangement, heat to be generated in the generating zone can be effectively used as a heat source for the reforming reaction to be conducted in the reforming zone, thereby making it possible to avoid temperature increase inside the fuel cell.

Gases are also introduced through the lower header in this invention. The individual unit cells can therefore be fed evenly with a sufficient amount of each gas even when many unit cells are stacked, so that the generator efficiency of the fuel cell is increased.

Figure 9:
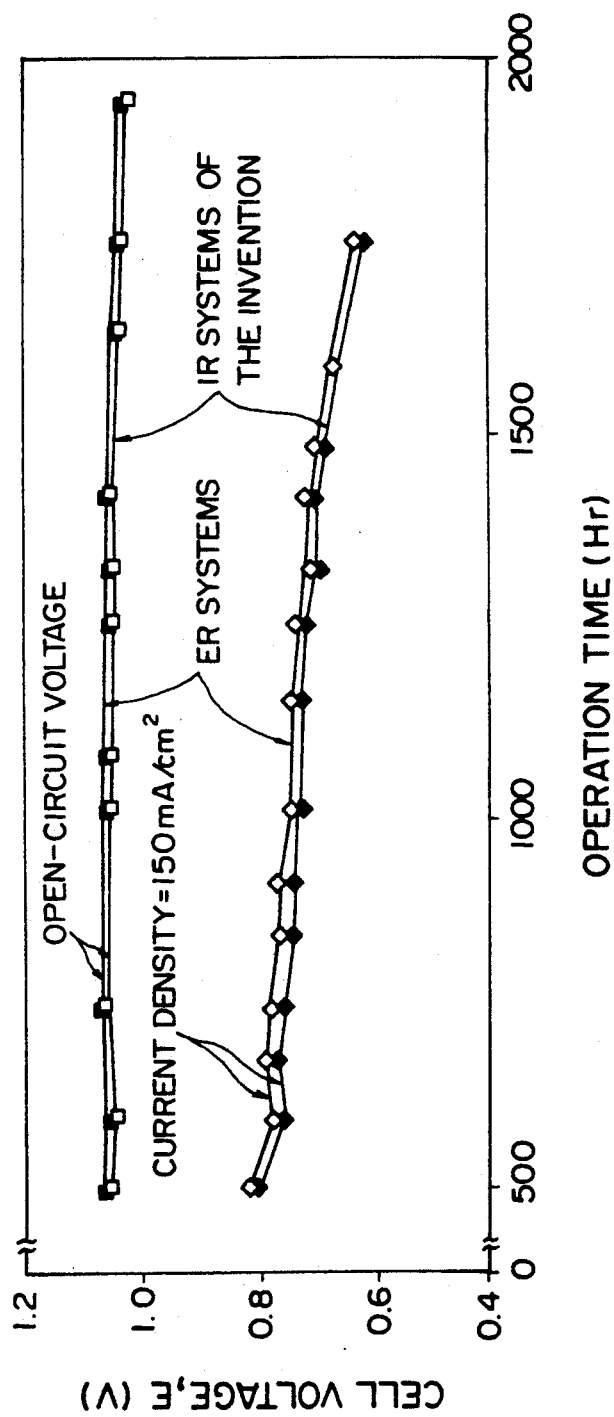
FIG. 9 is a diagram showing a relationship between cell voltage and operation time when power generation was performed by internal and external reforming methods of the invention, respectively.

FIG. 9 diagrammatically illustrates the results of experiments conducted using the fuel cell of this embodiment, one on generation of power by an internal reforming in which a fuel cell according to the invention was used and the other on generation of power by an external reforming method in which hydrogen gas was fed from the beginning.

Cell voltage is plotted along the axis of ordinates, while operation time is plotted along the axis of abscissas.

As is apparent from FIG. 9, the open circuit voltage remained substantially constant within a range of 1.0–1.1 V in both the generation of power by the internal reforming method according to the invention and that by the external reforming method. When a current of 150 mA/cm$^2$ current density was applied through a closed circuit, the generation of power by the internal reforming method according to the invention and that by the external reforming method exhibited substantially the same cell voltage performance even when the operation time lengthened.

This indicates that the IR fuel cell of the invention did not develop contamination of its reforming catalyst like the external reforming method.

Figure 10:
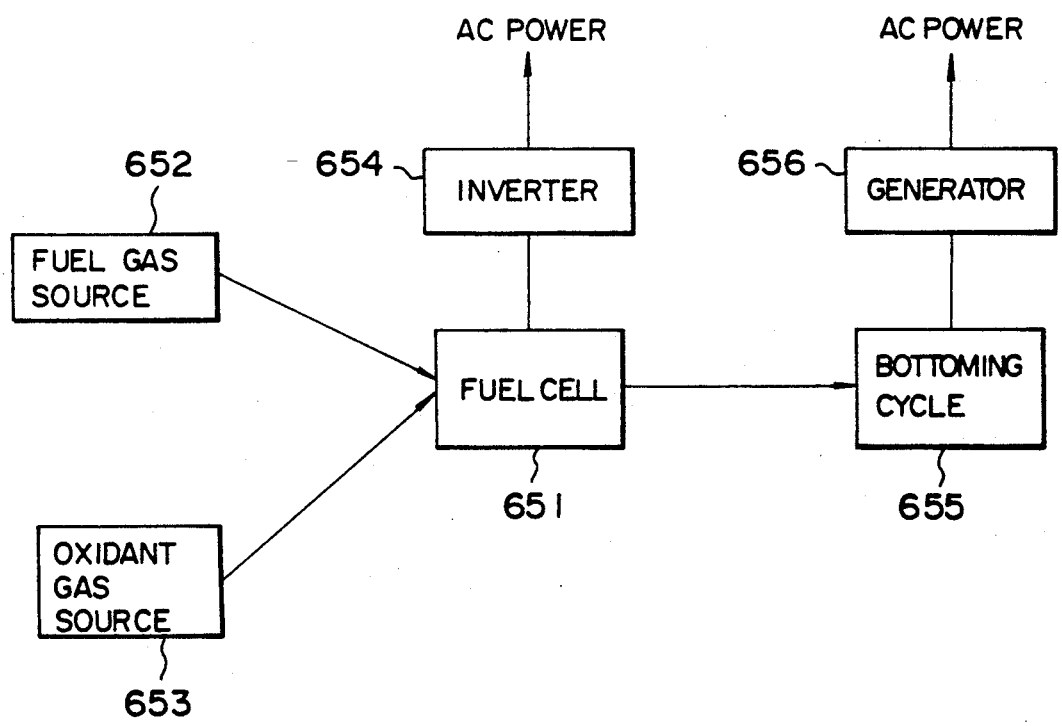
FIG. 10 is a schematic diagram illustrating one example of the basic construction of a power station in which an IR fuel cell of the invention is used.

One example of the basic construction of a power station using an IR fuel cell of the invention will next be described with reference to FIG. 10.

The power station comprises a fuel cell 651 according to the invention, a fuel gas source 652, an oxidant gas source 653, and an inverter 654 for converting d.c. power, which is generated by the fuel cell, into a.c. power. In large-scale power generation, a bottoming cycle 655 and a generator 656 connected to the bottoming cycle 656 can be used to utilize exhaust heat to be generated from the fuel cell.

The fuel cell of the invention has high utilization efficiency for gas to be fed and its cell life is long, because the performance of its reforming catalyst is stable. The operation cost of the power station per unit energy to be produced is low.

Since the fuel cell of the invention has long life, labor required for the replacement of the fuel cell can be saved so that large-scale power generation can be facilitated. The use of the bottoming cycle therefore makes it possible to increase the generator efficiency further so that the operation cost of the power station can be reduced further.

As has been described based on the foregoing embodiments, in each unit cell of an IR fuel cell according to the invention, the reforming zone and the generating zone are separated from each other and exhaust fuel gas, which will contaminate the reforming catalyst, is therefore not allowed to flow into the reforming zone. The fuel cell can therefore enjoy long life.

Further, the reforming zone of a desired unit cell and the generating zone of another unit cell disposed below the first-mentioned unit cell are arranged in an opposing up-to-down relation. Heat to be generated in the generating zone can therefore be effectively used as a heat source for the reaction to be conducted in the reforming zone. This allows to avoid temperature increase inside the fuel cell and moreover lengthens the cell life.

The power station using the IR fuel cell of the invention has high operation efficiency and can generate energy at lower unit price because the fuel cell has long life.

We claim:

1. An internal reforming fuel cell comprising a plurality of unit cells stacked together in a first direction, each of said unit cells comprising a cathode an anode and an electrode plate therebetween, and a separator; said cathode, electrode plate and anode defining a generating zone and said separator defining a fuel gas flow channel communicating with a fuel gas inlet and a fuel gas outlet and including a divided fuel gas flow channel in contact with a surface of said anode, and an oxidant gas flow channel communicating with an oxidant gas inlet and oxidant gas outlet and including a divided oxidant gas flow channel in contact with a surface of a cathode of an adjacent unit cell; wherein each of said unit cells further comprises a reforming zone for reforming fuel gas provided in said fuel gas flow channel and positioned adjacent said generating zone in a second direction perpendicular to said first direction.

2. The internal-reforming fuel cell of claim 1, wherein a reforming zone of one unit cell is arranged at a position overlapped, with a generating zone of another unit cell located adjacent to said one unit cell in the first direction of.

3. The internal-reforming fuel cell of claim 1, wherein each of said unit cells belongs to either a first system or a second system, said unit cells in said first system and said unit cells in second system are alternately stacked in the first direction, said reforming zones of unit cells in said first system are arranged at positions overlapped with said generating zones of said unit cells in said second system in the first direction, and said fuel gas and oxidant gas flow channels associated with said unit cells in said first system are formed independently of said flow channels associated with said unit cells in said second system.

4. The internal-reforming fuel cell of claim 1, wherein said separator defines, in a peripheral edge portion thereof, an inlet and an outlet for said divided fuel gas flow channel and an inlet and an outlet for said divided oxidant gas flow channel.

5. The internal-reforming fuel cell of claim 1, wherein said separator of each unit cell has a central partition wall, said fuel gas flow channel is provided along one side of said central partition wall, and said oxidant gas flow channel is provided along the other side of said central partition wall.

6. The internal-reforming fuel cell of claim 5, wherein said reforming zone is arranged in said fuel gas flow channel provided in one side of said separator and a cover plate covering an outer side of said reforming zone is provided to isolate said reforming zone from products in said generating zone.

7. The internal-reforming fuel cell of claim 4, wherein said inlet for each of said divided channels is formed in one peripheral edge portion of said separator of each unit cell and said outlet for each of said divided channels is formed in another peripheral edge portion of said separator, the another peripheral edge portion being opposite to the one peripheral edge portion.

8. The internal-reforming fuel cell of claim 4, wherein said inlet for each of said divided fuel gas flow channel is formed in a first peripheral edge portion of said separator of each unit cell and said outlet for each of said divided fuel gas flow channel is formed in a second peripheral edge portion of said separator, said second peripheral edge portion being opposite the first peripheral edge portion at a position other than a position where the distance between said inlet and said outlet is the shortest.

9. The internal-reforming fuel cell of claim 1, further comprising a manifold extending through said separators of said stacked individual unit cells, whereby said fuel gas flow channel or oxidant gas flow channel of each unit cell is formed.

10. The internal-reforming fuel cell of claim 5, wherein each unit cell further comprises, at an area of contact between said central partition wall of said separator and the anode of the unit cell, an anode support member having at least one projection supporting said anode of the unit cell thereon and at least one recess forming said fuel gas flow channel.

11. The internal-reforming fuel cell of claim 10, wherein said anode support member is a plate member having at least one linear groove extending in the same direction as the direction of flow of the fuel gas.

12. The internal-reforming fuel cell of claim 6, wherein each unit cell further comprises, at an area of contact between said central partition wall of said separator and the cathode of the unit cell, a cathode support member having at least one projection supporting said cathode of the unit cell thereon and at least one recess forming said oxidant gas flow channel.

13. The internal-reforming fuel cell of claim 12, wherein said cathode support member is a plate-like member having at least one linear groove extending in the same direction as the direction of flow of the oxidant gas.

14. An internal-reforming fuel cell according to claim 1, wherein said reforming zone is provided in said fuel gas flow channel between said fuel gas inlet and said divided fuel gas flow channel.

15. An internal-reforming fuel cell according to claim 1, wherein, within each unit cell, said reforming zone is offset from said generating zone in said first direction.

16. An internal-reforming fuel cell comprising a plurality of unit cells stacked together in a first direction, each of said unit cells comprising a generating zone and a reforming zone adjacent said generating zone in a second direction perpendicular to said first direction, wherein said generating zone includes a cathode, an anode and an electrode plate therebetween, and wherein said reforming zone includes a reforming catalyst for reforming a fuel gas.

17. An internal-reforming fuel cell according to claim 16, wherein said unit cells are stacked such that the generating zone of one unit cell overlaps the reforming zone of an adjacent unit cell and the reforming zone of said one unit cell overlaps the generating zone of said adjacent unit cell in said first direction.

18. An internal-reforming fuel cell according to claim 16, wherein, within each unit cell, said reforming zone is offset from said generating zone in said first direction.

19. In a power station for generating power including a fuel cell, a fuel gas source and an oxidant gas source, the improvement wherein said fuel cell comprises an internal-reforming fuel cell comprising a plurality of unit cells stacked together in a first direction, each of said unit cells comprising a generating zone and a reforming zone adjacent said generating zone in a second direction perpendicular to said first direction, wherein said generating zone includes a cathode, an anode and an electrode plate therebetween, and wherein said reforming zone includes a reforming catalyst for reforming a fuel gas.

20. A power station according to claim 19, wherein, within each unit cell, said reforming zone is offset from said generating zone in said first direction.

* * * * *